United States Patent
Crowley

(10) Patent No.: US 11,574,061 B2
(45) Date of Patent: *Feb. 7, 2023

(54) ROLLBACK RESISTANT SECURITY

(71) Applicant: GOOGLE LLC, Mountain View, CA (US)

(72) Inventor: Paul Dermot Crowley, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 104 days.

This patent is subject to a terminal disclaimer.

(21) Appl. No.: 17/024,589

(22) Filed: Sep. 17, 2020

(65) Prior Publication Data

US 2021/0004467 A1 Jan. 7, 2021

Related U.S. Application Data

(63) Continuation of application No. 16/054,020, filed on Aug. 3, 2018, now Pat. No. 10,810,312, which is a (Continued)

(51) Int. Cl.
*G06F 21/57* (2013.01)
*H04L 9/08* (2006.01)
(Continued)

(52) U.S. Cl.
CPC ............ *G06F 21/575* (2013.01); *G06F 21/57* (2013.01); *H04L 9/0861* (2013.01);
(Continued)

(58) Field of Classification Search
CPC ........ G06F 1/3202; G06F 1/3231; G06F 1/26; G06F 1/206; G06F 1/3228; G06F 1/08;
(Continued)

(56) References Cited

U.S. PATENT DOCUMENTS 6,681,329 B1 1/2004 Fetkovich et al.
6,684,326 B1 1/2004 Cromer et al.
(Continued)

FOREIGN PATENT DOCUMENTS

WO 2011130554 10/2011

OTHER PUBLICATIONS

Antenucci, et al., "A Declarative Query Processing System for Nowcasting", Proceedings of the VLDB Endowment 10(3):145-156, Nov. 2016, 12 pages.
(Continued)

*Primary Examiner* — Zahid Choudhury
(74) *Attorney, Agent, or Firm* — McDonnell Boehnen Hulbert & Berghoff LLP

(57) ABSTRACT

Methods, systems, and apparatus, including computer programs encoded on a computer storage medium, for rollback resistant security are disclosed. In one aspect, a method, during a boot process of a computing device, includes the actions of obtaining a secret key derived from device-specific information for the computing device. The method further includes verifying that a signature for a software module is valid. The method further includes obtaining information indicating a current version of the software module. The method further includes using the secret key to generate a first encryption key corresponding to the current version of the software module and a second encryption key corresponding to a prior version of the software module. The method further includes preventing future access to the secret key until the computing device is rebooted. The method further includes providing the software module access to the first encryption key and the second encryption key.

20 Claims, 5 Drawing Sheets

Related U.S. Application Data continuation of application No. 15/371,427, filed on Dec. 7, 2016, now Pat. No. 10,049,218.

(51) Int. Cl.
*H04L 9/14* (2006.01)
*H04L 9/32* (2006.01)

(52) U.S. Cl.
CPC .............. *H04L 9/0866* (2013.01); *H04L 9/14* (2013.01); *H04L 9/3247* (2013.01)

(58) Field of Classification Search
CPC ...... G06F 1/3289; G06F 1/266; G06F 21/575; G06F 21/57; H04L 12/12; H04L 9/0861; H04L 9/0866; H04L 9/14; H04L 9/3247; H04L 12/10
See application file for complete search history.

(56) References Cited

U.S. PATENT DOCUMENTS

| | | | |
|---|---|---|---|
| 7,328,341 | B1 | 2/2008 | Eun et al. |
| 7,409,546 | B2 | 8/2008 | Platt |
| 7,853,780 | B2 | 12/2010 | Rotondo et al. |
| 8,151,249 | B2 | 4/2012 | Ohta et al. |
| 8,566,594 | B2 | 10/2013 | Soliman et al. |
| 9,122,864 | B2 | 9/2015 | Dayka et al. |
| 9,515,832 | B2 | 12/2016 | Agarwal et al. |
| 10,049,218 | B2 | 8/2018 | Crowley |
| 10,394,570 | B2* | 8/2019 | Baik ................ G06F 9/4406 |
| 10,810,312 | B2 | 10/2020 | Crowley |
| 11,159,497 | B2* | 10/2021 | Smelov ............. H04L 63/0442 |
| 2010/0146301 | A1 | 6/2010 | Shevchenko et al. |
| 2011/0087872 | A1 | 4/2011 | Shah et al. |
| 2012/0240236 | A1 | 9/2012 | Wyatt et al. |
| 2014/0149748 | A1 | 5/2014 | Ang et al. |
| 2015/0012738 | A1* | 1/2015 | Shah .................... G06F 21/572 713/2 |
| 2015/0193224 | A1 | 7/2015 | Ziat et al. |
| 2015/0312271 | A1 | 10/2015 | Glover et al. |
| 2015/0379270 | A1 | 12/2015 | Chen et al. |
| 2016/0364297 | A1* | 12/2016 | Lo ...................... G06F 11/1417 |
| 2017/0262328 | A1* | 9/2017 | Hirose ................ G06F 11/0778 |
| 2018/0024942 | A1 | 1/2018 | Canepa et al. |
| 2018/0157840 | A1 | 6/2018 | Crowley |
| 2018/0246552 | A1* | 8/2018 | Thompson .......... G06F 11/3093 |
| 2019/0026471 | A1 | 1/2019 | Crowley |
| 2019/0028266 | A1 | 1/2019 | Darmon et al. |
| 2019/0097798 | A1 | 3/2019 | Hunt et al. |
| 2019/0174319 | A1 | 6/2019 | Backholm et al. |

OTHER PUBLICATIONS

Sekhavat, "Nowcasting Mobile Games Ranking Using Web Search Query Data", International Journal of Computer Games Technology, Jan. 2016, 10 pages.
Shenoy, "Utilizing Web Data to Detect Harmful Application Software", Technical Disclosure Commons, https://www.tdcommons.org/dpubs_series/4469, Jul. 22, 2021, 12 pages.
"Non-Final Office Action", U.S. Appl. No. 16/054,020, 9 Pages.
"Notice of Allowance", U.S. Appl. No. 15/371,427, dated Apr. 11, 2018, 8 pages.
"Notice of Allowance", U.S. Appl. No. 16/054,020, filed Jun. 25, 2020, 7 Pages.

* cited by examiner

ROLLBACK RESISTANT SECURITY

CROSS-REFERENCE TO RELATED APPLICATIONS

This application is a continuation application of U.S. application Ser. No. 16/054,020, filed Aug. 3, 2018, which is a continuation application of U.S. application Ser. No. 15/371,427, filed Dec. 7, 2016, now U.S. Pat. No. 10,049,218, the disclosures of which are incorporated by reference herein in their entirety.

FIELD

This application relates to computer security.

BACKGROUND

A computing device may encrypt files to prevent others from reading the contents of the files. The computing device may encrypt files using either symmetric encryption or public key encryption. In symmetric encryption, the computing device uses the same key to encrypt and decrypt files. In public key encryption, the computing device uses a public key to encrypt files and a private key to decrypt files. The computing device may use another public-private key pair for digital signatures by using the private key to sign and the public key to verify the signature.

SUMMARY

To prevent unauthorized software from being installed on a computing device, a computing device may require that that the software be digitally signed. Before installing new software or upgrading existing software, the computing device may verify the signature of the software. When a computing device boots, the bootloader may verify the digital signature of the operating system. If the digital signature is valid, then the bootloader continues the boot process. If the digital signature is not valid, then the bootloader may not continue the boot process and instead return an error. By requiring a valid signature, a computing device may prevent unauthorized software that may have intentionally added vulnerabilities that an attacker plans to exploit from being installed. As authorized software also includes unintentional vulnerabilities, a software developer may provide a signed software upgrade to the user to install and patch the vulnerability. If an attacker wished to exploit the newly patched vulnerability, then the attacker could roll back the upgrade and expose the vulnerability. Preventing an attack of this type may be particularly important in an operating system. In particular, an attacker could potentially use the rolled-back version to gain access to user data even if the user data was encrypted. For example, if the patched version and the insecure previous version used the same encryption keys, then the attacker could use the encryption keys of the insecure version to gain access to any user data. Even if the patched version stored new data with a new encryption key, the attacker could potentially access user data encrypted using the prior key after rolling back to the prior version. As a result, even encrypted user data could be at risk of unauthorized access after rolling back to an earlier software version.

To prevent user data from being accessed in an attack such as this, a computing system may use a system of checks where the bootloader verifies the authenticity of the current operating system while also generating the encryption keys necessary to decrypt the user information. Each version of the operating system can use a different encryption key, so that prior versions of the operating system cannot access data encrypted by a later version. When installing a new version of an operating system, a transition is made to a new encryption key for the new version of the operating system.

Each time the system is booted, the bootloader generates the encryption key for the current version of the operating system as well as the encryption keys for the prior versions of the operating system. The encryption keys for the prior versions ensures backward compatibility for decrypting user data that may not have been encrypted with the encryption key of the current version. Additionally, it allows the new version of the operating system to decrypt user data and re-encrypt it with the current encryption key, so it can no longer be accessed by the prior version. In some implementations, the bootloader uses the version numbers of each operating system version to generate the encryption keys. The bootloader can also erase or otherwise deny access to the data needed to generate encryption keys early in the boot process. As a result, by the time control is passed to the operating system, the data needed to generate encryption keys is unavailable, and will not be available again until the system is rebooted.

When a prior version of the operating system is loaded on the computing device, the bootloader generates encryption keys only for that prior version and earlier versions. As a result, the bootloader does not generate an encryption key for the current version, which is the key that secures the user information. Thus, after updating to the current operating system and encrypting user data with the current encryption key, an attacker that rolls back to a prior version of the operating system would not be able to access the user data.

The techniques described herein allow security of user data while allowing customized software and non-standard software to be run. With these techniques, a user remains free to install any version of the software on a device, including older versions. However, encrypted data from a later version is still protected from access by an earlier version. Further, as discussed below, the system allows different software modules to use different public keys and software identifiers, which result in different encryption keys. This allows developers or users to install customized software, with each software module having its own unique encryption keys.

According to an innovative aspect of the subject matter described in this application, a method for rollback resistant security includes the actions of during a boot process of a computing device, obtaining, by the computing device, a secret key derived from device-specific information for the computing device; during the boot process of the computing device, verifying that a signature for a software module is valid; during the boot process of the computing device, obtaining information indicating a current version of the software module; during the boot process of the computing device, based on verifying that the signature for the software module is valid, using the secret key to generate (i) a first encryption key corresponding to the current version of the software module and (ii) a second encryption key corresponding to a prior version of the software module; during the boot process of the computing device, after using the secret key to generate the first encryption key and the second encryption key, preventing future access to the secret key until the computing device is rebooted; and during the boot process of the computing device, providing the software module access to the first encryption key and the second encryption key.

These and other implementations can each optionally include one or more of the following features. The device-specific information for the computing device is stored in hardware, is immutable, and is not accessible to the software module. The actions further include, based on verifying that the signature for the software module is valid, using the secret key to generate an encryption key for each of the prior versions of the software module. The software module is an operating system or a kernel. The actions further include, after providing the operating system or the kernel access to the first encryption key and the second encryption key, providing control of the computing device to the operating system or the kernel. The action of preventing future access to the secret key until the device is rebooted includes overwriting the secret key. The action of preventing future access to the secret key until the device is rebooted includes preventing a system on a chip that stores the secret key from allowing access to the secret key. The information indicating a current version of the software module is an integer. The information indicating a current version of the software module is a version number of the software module. The actions further include, based on the information indicating a current version of the software, determining information indicating a prior version of the software module.

The actions further include obtaining a public key of the software module. The first encryption key and the second encryption key are based on the public key. The action of verifying that a signature of the software module is valid includes obtaining a public key of the software module; and verifying the signature of the software module using the public key of the software module. The public key is used to generate (i) the first encryption key corresponding to the current version of the software module and (ii) the second encryption key corresponding to a prior version of the software module based on verifying the signature of the software module using the public key of the software module. The information indicating the current version of the software module is obtained from the signature of the software module. The information indicating the current version of the software module is part of data signed to generate the signature for the software module. The actions further include determining that the software module is upgraded to the current version; in response to determining that the software module is upgraded to the current version, decrypting user information using the second encryption key corresponding to the prior version of the software module; and in response to determining that the software module is upgraded to the current version, encrypting the decrypted user information using the first encryption key corresponding to the current version of the software module.

Other embodiments of this aspect include corresponding systems, apparatus, and computer programs recorded on computer storage devices, each configured to perform the operations of the methods.

The subject matter described in this application may have one or more of the following advantages. A computing device may protect user information from being decrypted by using encryption keys that are related to software version numbers and a public key of the software. A computing device allows unofficial software versions to be installed without allowing access to the user information encrypted with the official software version because unofficial software will likely use a different public key than the official software versions. Because the user information is encrypted with a key based on the public key of the official software version, the user information is protected if unofficial software is installed. A computing device may only require that a digital signature of the operating system be valid to boot the device and load the operating system.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

In the drawings, like reference numbers represent corresponding parts throughout.

DETAILED DESCRIPTION

Figure 1:
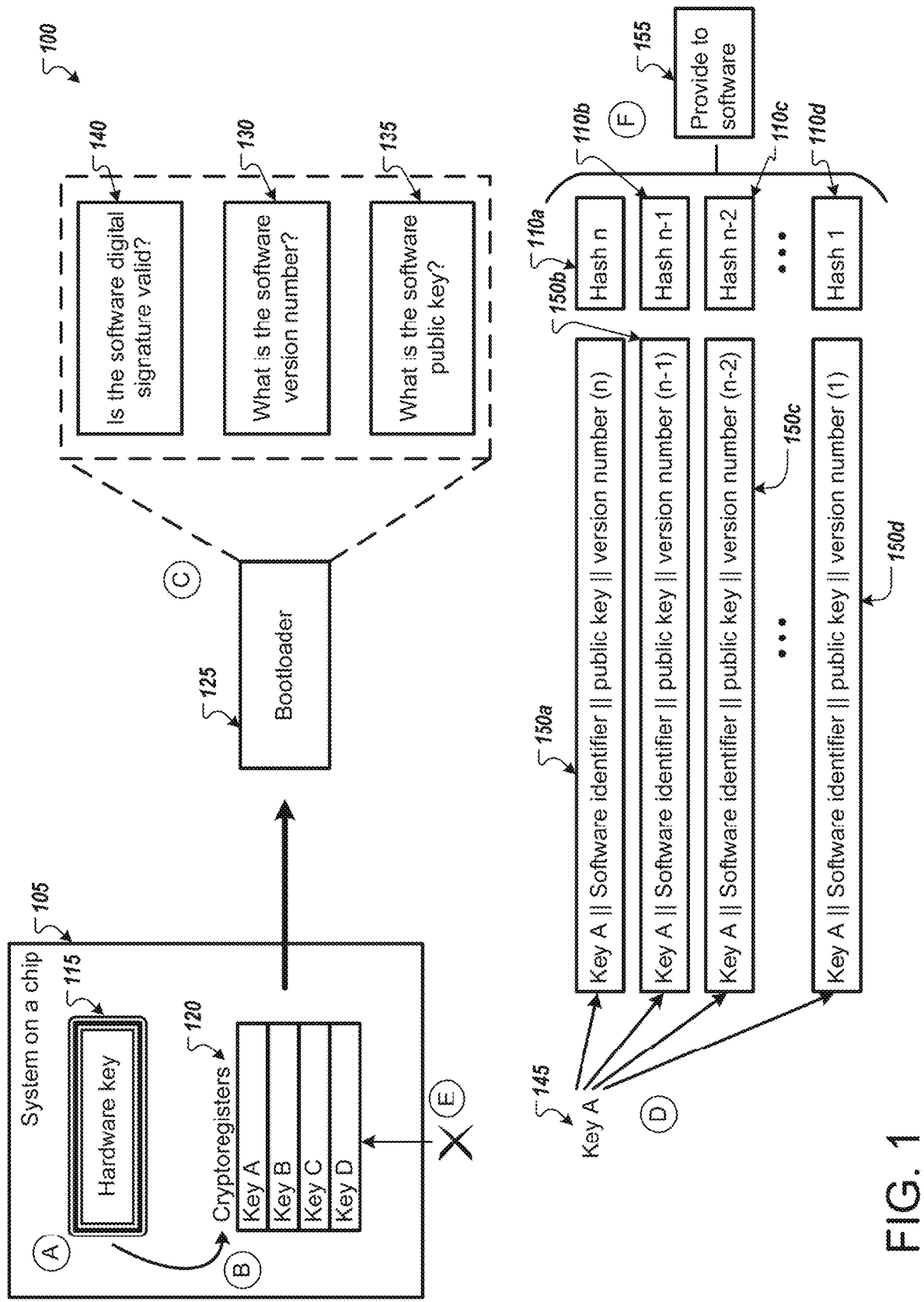
FIG. 1 illustrates an example system for rollback resistant security.

FIG. 1 illustrates an example system 100 for rollback resistant security. Briefly, and as described in more detail below, during the boot process of the system 100, the system on a chip 105 generates a key set 110*a*-110*d* for a software module. The key set 110*a*-110*d* includes keys for the current version of the software in addition to keys for prior versions of the software.

As illustrated in FIG. 1, the system 100 includes a system on a chip 105 that includes a hardware key 115. The hardware key 115 may be a key that is hardcoded into the system on a chip 105 and can be read only once during a boot process. Similarly, the hardware key 115 can be secured so that it is not readable after the boot process. The hardware key 115 may be stored in fuses or a similar mechanism that only allows one read during a power cycle. The hardware key 115 may be unique for the system on a chip 105 such that each system on a chip includes a different hardware key that cannot be changed. As a result, the hardware key 115 is device-specific and the further information derived from the hardware key 115 is also device-specific.

During stage A, the system on a chip 105 accesses the hardware key 115 during the beginning of the boot process. The boot process may be initialized by supplying power to the system 100 or by initiating a restart of the system 100. As noted above, the system on a chip 105 may only access the hardware key 115 once during a power cycle.

During stage B, the system on a chip 105 uses the hardware key 115 as a seed to populate the keys of the cryptoregisters 120. The cryptoregisters 120 may include multiple registers that are configured to temporarily store cryptographic keys that may be used by the system 100. In some implementations, the cryptoregisters 120 may only be accessible during the boot process. After the boot process is complete, the system 100 may erase or block access to the cryptoregisters 120. During each boot, the algorithm used by the system on a chip 105 may be the same such that the each of the cryptoregisters 120 includes the same key at the beginning of each boot cycle. For example, Key A may always be 1w2x3y4z, and Key B may always be 5a6b7c8d for the particular system on a chip 105.

At stage C, the system on a chip 105 initializes the bootloader 125. The bootloader 125 continues the booting process, and will eventually load the operating system. As part of the boot process, the bootloader generates a key set 110a-110d for later use by the operating system. The key set 110a-110d is generated based at least in part on the data stored in the cryptoregisters 120. As part of the process of generating the key set 110a-110d, the bootloader 125 obtains the version number of the software that will receive the key set 110a-110d (130). In some implementations, the software is the operating system. Version numbers can be assigned using a predetermined scheme that allows the bootloader to reliably decrement from a current version number through all previous version numbers. The version number may be configured such that the bootloader 125 is able to determine each version number for each of the prior versions. For example, each of the version numbers may be an integer. If the version number is version five, then the version numbers for each of the prior versions would be one, two, three, and four. In some implementations, the bootloader 125 obtains the version number by reading it from a file while in the process of loading the operating system. In some implementations, the bootloader 125 obtains the version number from the digital signature of the operating system. The version number may be part of the data signed. In verifying the signature, the bootloader extracts the version number.

Continuing with stage C, the bootloader 125 obtains a public key of the software that will receive the key set 110a-110d (135). The public key can be stored locally on the device that is being booted, e.g., as part of the software or in accompanying data. The bootloader 125 may look up the public key and access it from a storage device of the device being booted. For example, the public key can be stored in a particular file, format, or memory location or other manner so that the bootloader can look up the stored public key. The device may have previously received the public key of the software upon installation or upgrading of the software. For example, the previous time the software was upgraded from version four to version five, part of the installation process involved the device receiving the public key of the new software version, e.g., as part of a securely signed data package or from a key server.

In some implementations, the public key for a software module may be stored by the bootloader 125 or may be stored in a secured location on the system on a chip 105 so that the bootloader 125 can access them during the boot process. For example, the secured location may be a location that is only accessible by the bootloader 125. The operating system may be able to write to this secured location to add keys after receiving a new public key from a trusted key server. In some implementations, the bootloader 125 may query a key server for the public key of the software. The key server may be a trusted key server that includes only verified public keys. Because the bootloader 125 may not be able to access a key server during the boot process, the bootloader 125 may access a file of trusted public keys. The file of trusted public keys may be populated by the operating system during a previous session.

In some implementations, the bootloader 125 may not be able to obtain the public key of the software. Without the public key, the bootloader 125 may not be able to verify the integrity of the software. In this instance, the bootloader 125 may return an error and not load the software, e.g., not load the operating system. For example, the bootloader 125 may display an error on the display of the computing device that indicates a boot error. In some implementations, if an error such as this occurs, the user may have to recover from the error by either restoring the public key or resetting the computing device, e.g., by returning to factory settings or performing a clean install of the software, which would eliminate user data at risk of attack.

In some implementations, the bootloader 125 may identify a software identifier from the files accessed during the boot process. The software identifier may be any type of unique identifier for the software. For example, the software identifier may be an eight-digit alphanumeric code that is the same for each version of the software. In some implementations, the software identifier may change for each version of the software such that identifiers for prior versions of the software are different than the software identifiers for the current version. In this instance, the software may have to include a file that includes software identifiers for the previous versions. The bootloader 125 may access the file during the boot process.

Continuing with stage C, the bootloader 125 verifies a digital signature of the software (140). In the example where the software is the operating system, the bootloader 125 reads a file, as it loads the operating system, that includes the digital signature of the operating system. The bootloader 125 verifies the digital signature using the public key of the operating system. To verify the digital signature, the bootloader 125 may use the appropriate algorithm that corresponds to the algorithm used to sign the operating system. For example, the operating system may have been signed with an RSA based signature algorithm. To verify that signature, the bootloader 125 would use the RSA based signature algorithm. If the bootloader 125 is able to identify the signature as including a version number, then the bootloader 125 verifies the signature. By verifying the digital signature, the bootloader 125 verifies that the operating system has not been altered since the operating system was signed. Verifying the digital signature also allows the bootloader 125 to determine that the entity who has the private key of the digital signature, which is likely the provider of the software, actually provided the software. In some implementations, the version number of the software is part of the data included in the digital signature. For example, if the version number is five, then when signing the software, the version number five and possibly other information are included in the signed payload.

In some implementations, the bootloader 125 may not be able to verify the digital signature of the software. In this instance, the bootloader 125 may return an error and not load the operating system. In this manner, the bootloader 125 blocks loading of an operating system or other software module that has been compromised. For example, if a compromised system alters signed data to indicate an incorrect version number to impersonate a later version of the software, the signature would not be valid and so the bootloader 125 would not generate the encryption keys for the incorrect version. For example, the bootloader 125 may display an error on the display of the computing device that indicates a boot error. If an error such as this occurs, the user may have to re-install a valid version of the software, or reset the computing device to recover from the error, e.g., by restoring the device to factory settings or performing a clean install of the software. In the instance where this error occurs for an application other than the operating system, then the operating system may return an application error. To recover from an error for the application, the user may have to reinstall the application.

With the current and previous software version numbers obtained and the software verified, the bootloader 125 generates the key set 110a-110d. At stage D, the bootloader 125 reads a key 145 from the cryptoregisters 120. The bootloader 125 uses the key 145 to generate the values 150a-150d which the bootloader will later hash to generate the key set 110a-110d. The bootloader 125 may select key 145 based on the software identifier. For example, the bootloader 125 may select key 145 based on the software being the operating system. The bootloader 125 may select different keys from the cryptoregisters 120 for different software modules. For example, if the software identifier identifies the radio, then the bootloader 125 may use key B from the cryptoregisters 120. In some implementations, the bootloader 125 may use different keys from the cryptoregisters for the same software module. For example, the bootloader 125 may user both key B and key C for a particular software module in generating each of the values 150a-150d. As another example, the bootloader 125 may use key B to generate the values 150a-150d that correspond to even version numbers and key C to generate the values 150a-150d that correspond to odd version numbers.

To generate each of the values 150a-150d, the bootloader 125 combines the version number of the software with the key 145 and any combination of the public key of the software and the software identifier. The bootloader may only combine the version number of the software with the key 145 or may combine the version number of the software with the key 145 plus the public key of the software and/or the software identifier to generate the values 150a-150d. In some implementations, the public key is required to be part of the values 150a-150d. The bootloader 125 may concatenate the key 145, the version number of the software, the public key of the software, and the software identifier. For example, the bootloader may concatenate the software identifier followed by the public key followed by the version number followed by the key 145. In some implementations, the bootloader 125 may add the key 145, the software identifier, the public key, and the version number. To add the software identifier, the public key, and the version number that include more than just numbers, the bootloader may use the value that corresponds to the bytes stored for those values. As illustrated in FIG. 1, the bootloader 125 concatenates the software identifier with the public key and the version number to generate the value 150a. If key A is 5678, the software identifier is abc123, the public key is 7546wxyz, and the version number is four, then the value 150a is abc1237546wxyz45678. For each of the subsequent values, each value is one less because of the lower integer version number. For example, value 150b would be abc1237546wxyz35678. Value 150c would be abc1237546wxyz25678. Value 150d would be abc1237546wxyz15678.

In some implementations, the bootloader 125 uses the key 145 to encrypt or sign data that includes the version number and the public key and, optionally, the software identifier to generate values 150a-150d. In this implementation, the bootloader 125 may combine the public key and the version number and, optionally, the software identifier by concatenating them, adding them, or any other repeatable operation. The bootloader 125 may then encrypt that data using the key 145 or sign the data using the key 145 to generate the values 150a-150d. In some implementations, the bootloader 125 may use any repeatable process to generate the values 150a-150d as long as the values are based on a particular key from the cryptoregisters, e.g. key 145, the version number, and the public key.

Continuing with stage D, the bootloader 125 generates the key set 110a-110d by hashing the values 150a-150d. In some implementations, the bootloader uses the same hash algorithm, e.g., SHA-1, SHA-2, SHA-3, BLAKE, etc., to generate each of the keys in key set 110a-110d. In some implementations, the bootloader 125 may hash the values using different hashing algorithms or the same hashing algorithm Because each of the keys for each version number should be the same each time the system boots, the bootloader 125 consistently uses the same hashing algorithm for each key in the key set 110a-110d. For example, the bootloader 125 may user SHA-3 to compute key 110a, BLAKE2 to computer key 110b, MD5 to computer key 110c, and SHA-2 to compute key 110d. As another example, the bootloader 125 may SHA-3 for each key in the key set 110a-110d. In some instances, the hash algorithm may require an input that is different in length than the values 150a-150d. In instances where the values 150a-150d are too short, the bootloader 125 may add padding to the values 150a-150d. For example, the bootloader 125 may add padding to the beginning or the end of the values 150a-150d. In instances where the values 150a-150d are too long, the bootloader may remove the portion of the value that does not include the version number and the key 145. Continuing with the example above where value 150c is abc1237546wxyz25678, if the hashing algorithm accepted ten characters, then the input would be 6wxyz25678, thus preserving the version number and the key 145. In some implementations, the bootloader 125 may use one of the software identifier or the public key concatenated with the version number, then add padding before applying the hashing algorithm. The bootloader 125 may use this technique when a value with the software identifier, public key, and version number is too long for the hashing algorithm. The bootloader 125 may follow a similar process of stages C and D with Keys B, C, and D of the cryptoregisters 120 to generate a key set for different applications or modules of the computing device.

In stage E, after generating the key set 110a-110d, future access to the key 145 is blocked so it cannot be accessed until the device is rebooted. For example, the bootloader 125 and/or the system on a chip 105 prevent access to the cryptoregisters 120. In some implementations, the system on a chip 105 blocks access, potentially in response to a request or signal from the bootloader 125. In some implementations, the bootloader 125 may erase the values in the cryptoregisters 120 by overwriting the cryptoregisters 120. For example, the bootloader 125 may overwrite the cryptoregisters 120 with all zeros or all ones. In some implementations, the bootloader 125 may adjust the permissions of the cryptoregisters 120 to prevent any access to the cryptoregisters 120 by the operating system or any application. In some implementations, the bootloader 125 may adjust the permissions to prevent any access to the cryptoregisters 120 including access by the bootloader 125. In addition, the bootloader 125 can erase or overwrite any instances of the key 145 in working memory, so that the key 145 cannot be obtained by other software. These actions block access to the key 145 for the remainder of the operating session of the device. Even if a compromised operating system is loaded, it cannot obtain the key 145 needed to generate the keys in the key set 110a-110d and the key 145 will only become available again during a restart of the device, e.g., after powering the device off and on again or rebooting.

In stage F, the bootloader 125 provides the key set 110a-110d to the software and turns control over to the kernel (155). The software uses each of the keys in the key set 110a-110d to ensure backward compatibility so that the software is able to read encrypted data that may still be encrypted with keys that correspond to previous versions of the software. With control of the computing device, the kernel may unencrypt the user information when the system is unlocked. The kernel may encrypt the user information during the process of locking the system or during the power down process.

By using a framework illustrated in FIG. 1, a developer may use an unofficial version of the software for testing purposes. Similarly, a user may install a customized or non-standard version of the software. If the bootloader 125 is able to verify that the digital signature of the software is valid, then the bootloader 125 may continue with generating the key set 110a-110d. For a developer to digitally sign an unofficial version, the developer may either have access to the private key of the application or the developer may submit the unofficial version to entity that maintains the private key. The entity may then sign the unofficial version of the software. The developer may then install the software and the bootloader 125 will authenticate the software and generate the proper key set 110a-110d as long as the developer followed the version numbering convention. Alternatively, the unofficial version of the software may use a different public key, private key pair. As long as the bootloader 125 can verify that it has trusted public key, then the bootloader can verify a corresponding signature. The bootloader 125 may have access to a public key for an official release of the software and other public keys that developers may use for testing software.

In some implementations, it may not be important for the bootloader 125 to verify that a public key is trusted. As noted above, the public key may be part of the values 150a-150d. In this instance, installing a non-standard version of the operating system that uses a new public key may not allow a user to view the encrypted user information because the bootloader 125 generated a previous key set 110a-110d using a different public key. The user information may be encrypted with keys that the bootloader 125 may not be able to generate again without loading an operating system that uses the same public key as the one used to encrypt the user information.

Figure 2:
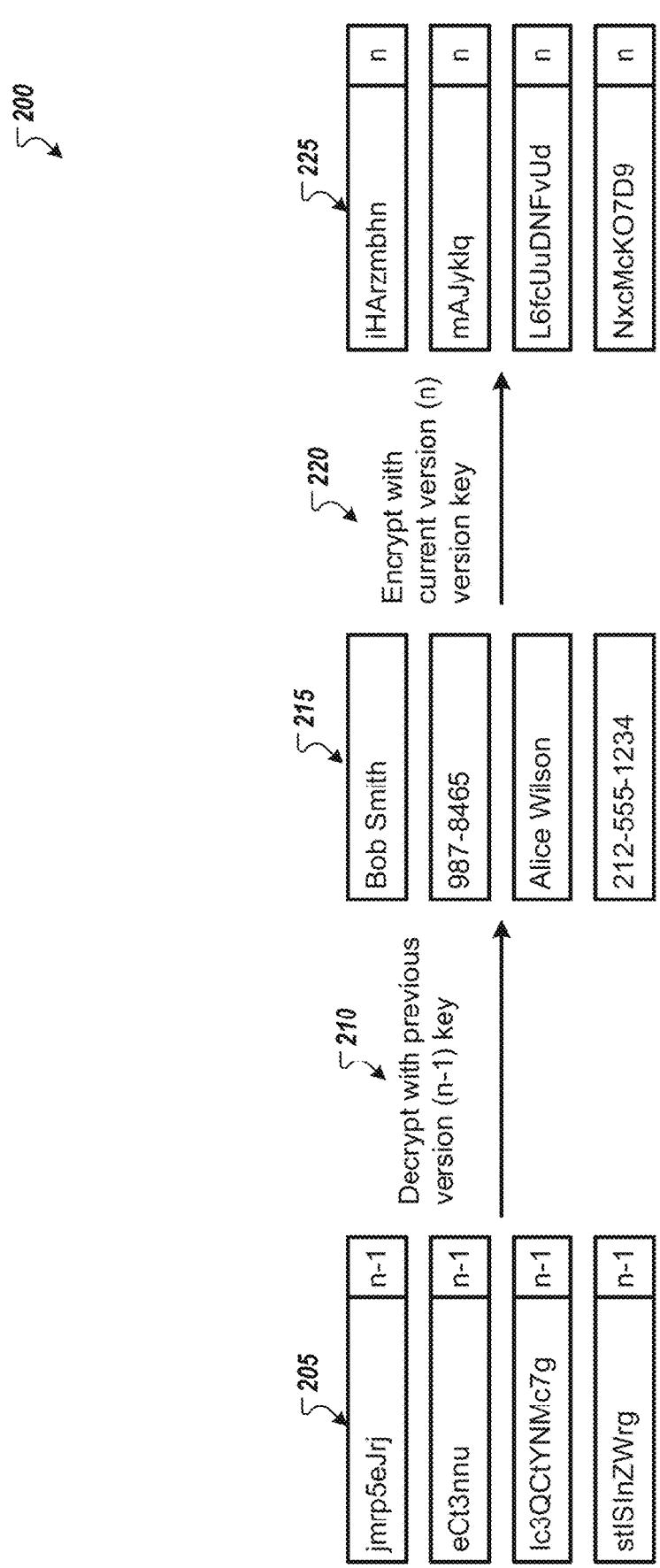
FIG. 2 illustrates an example decryption and encryption process during a software version upgrade.

FIG. 2 illustrates an example decryption and encryption process 200 during a software version upgrade. In general, the process 200 involves decrypting user information that is stored on a computing device using an encryption key that corresponds to a prior software version. The process 200 upgrades the software to the current version and then encrypts the user information with an encryption key that corresponds to a current software version.

To prevent unauthorized access to user information, a computing device stores encrypted user information 205. The user information may include any information generated or inputted by a user, for example, messages, contact information, photos, or any similar information. While the computing device powered off or locked, the computing device may store encrypted user information 205 instead of user information in an unencrypted form. When powered on or when unlocked, the computing device may unencrypt the user information so that the user is able to interact with the user information.

The computing device encrypted the encrypted user information 205 with an encryption key that corresponds to a prior version of the software. The software may be the operating system or another application. For example, the application may be a messaging application, email application, photo application, or any similar application. During upgrading of the software from the prior version to the current version, the computing device decrypts the encrypted user information 205 with the key 210 from the prior version of the software. In the example shown in FIG. 2, the prior version of the software is n-1 and the current version is n. Once decrypted using the key 210 from the prior version, the computing device has access to the unencrypted user information 215.

In some implementations and with the unencrypted user information 215 generated, the computing device upgrades the operating system or other application. The computing device may store the unencrypted user information 215 temporarily for the duration of the upgrade process. Once the computing device upgrades the application, the computing device generates a new key 220 that corresponds to the current software version. The computing device generates the key 210 and the key 220 using different numbers. Therefore, the key 210 and key 220 will almost always be different as is illustrated in process 200. With the key 220 for the current software version, the computing device, upon powering down or locking, the computing device encrypts the unencrypted user information 215 to generate encrypted user information 225. The computing device may store the encrypted user information 225 in the same location as the encrypted user information 225. Upon powering up or unlocking, the computing device decrypts the encrypted user information 225 with the key 220.

In some implementations, the computing device may upgrade the operating system and not encrypt the data with the new keys until the next boot cycle. This may be the case because the new keys are not generated until the next boot cycle. In this instance, the user upgrades the operating system. After booting the upgraded operating system for the first time, the operating system decrypts the user data using the key for the previous version and encrypts the data using the key for the current, upgraded version.

Figure 3:
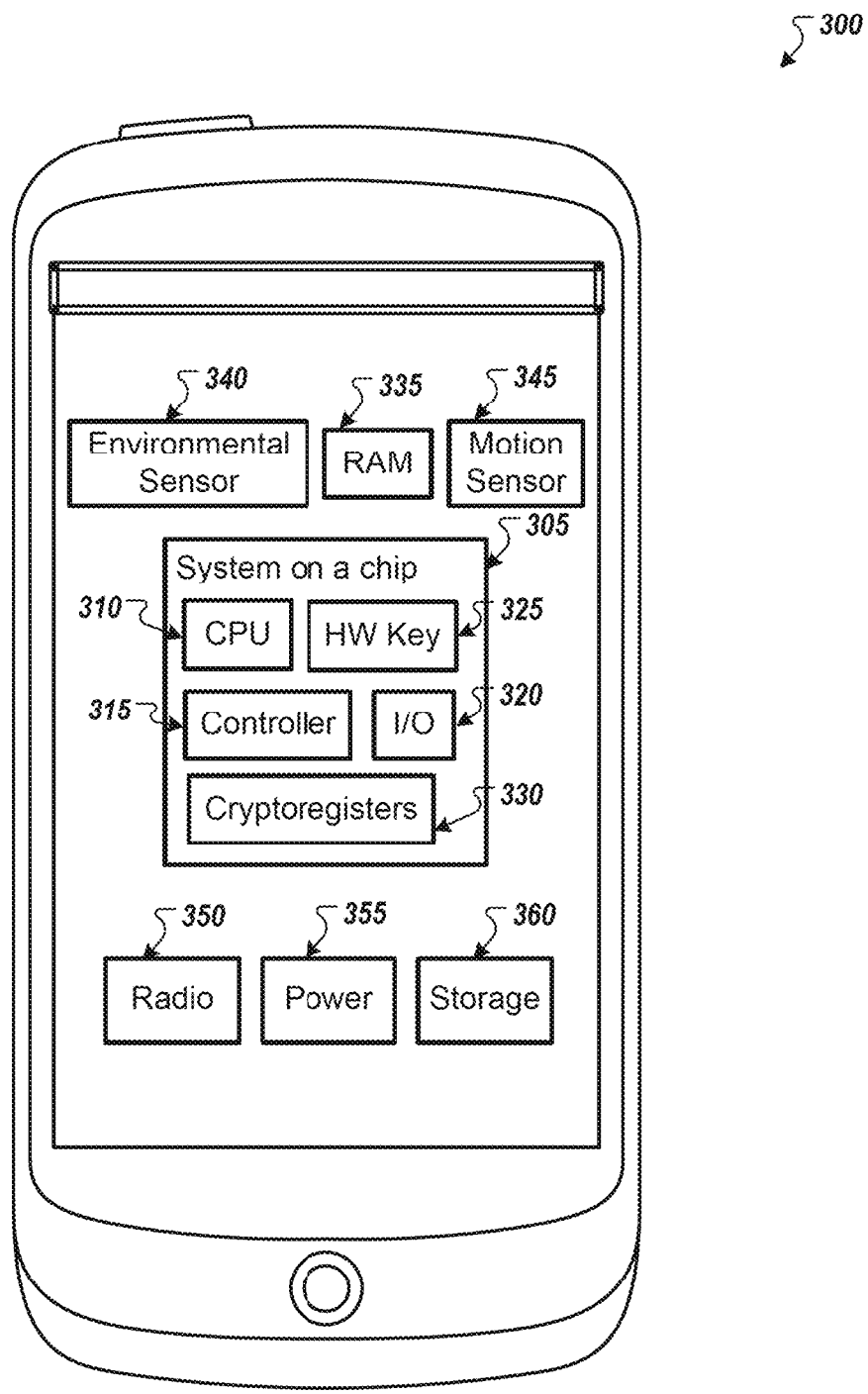
FIG. 3 illustrates an example computing device for rollback resistant security.

FIG. 3 illustrates an example computing device 300 for rollback resistant security. In general, the computing device 300 includes multiple components including a system on a chip 305. The system on a chip 305 may be similar to the system on a chip 105 as shown in FIG. 1. The computing device 300 may be any type of computing device such as a mobile phone, tablet, smart watch, smart speaker, home assistant, television, thermometer, smart appliance, desktop computer, wearable device, laptop computer, or any other similar device.

The system on a chip 305 includes several components such as a CPU 310, controller 315, and input/output module 320. Each of these components are included in the same chip even though in other implementations they may each be located on a separate chip. The CPU 310 includes one more processing cores and is responsible for the bulk of the computations of the system on a chip 305. The controller 315 may include components such as oscillators, phased locked loops, watch dog timers, and other timing components. The controller 315 may also include peripherals such as real-time timers, counter-timers, power on reset generators, and any other peripheral components. The input/output module 320 may include components to interface with devices and components outside the system on a chip 305. The input/output module 320 may include functionality to communicate with USB, FireWire, Ethernet, USART, SPI, or any other type of input/output interface.

The system on a chip 305 also includes a hardware key 325 and cryptoregisters 330. The hardware key may be similar to the hardware key 115 in FIG. 1, and the cryptoregisters 330 may be similar to the cryptoregisters 120 in FIG. 1. The hardware key 325 may be randomly assigned to the system on a chip 305 during the manufacturing process. The hardware key 325 may be stored in fuses and may only be readable once per boot cycle or once per power cycle. The hardware key 325 may be immutable. The hardware key 325 may have different permissions at varying points in the boot and power cycle. The hardware key 325 may only be readable during the initial portion of the boot cycle and only by the bootloader. In some implementations, the hardware key 325 may be unreadable by the kernel or any other application. In instances where the hardware key 325 is readable more than once per boot cycle, the bootloader may read the hardware key 325 then set the permissions of the hardware key 325 to be unreadable may any other components or application for the remainder of the boot cycle or any other period of time.

The cryptoregisters 330 include multiple registers that are each configured to store a secret key during the boot process. The bootloader may load the cryptoregisters 330 during the boot cycle and use the hardware key 325 as a seed for the values stored in the cryptoregisters 330. In some implementations, the values stored in the cryptoregisters 330 are the same during each boot cycle. The cryptoregisters 330 may include different permissions. The cryptoregisters 330 may only be readable by the bootloader and may only be written to once during a boot cycle. In some implementations, the bootloader may set the permissions to no read or write access by any component upon the completion of the boot cycle and the loading of the operating system. In some implementations, the bootloader may overwrite or delete the cryptoregisters 330 upon the completion of the boot cycle and the loading of the operating system.

The system on a chip 305 may include other components. For example, the system on a chip 305 may include analog interfaces includes analog to digital converters and digital to analog converters. The system on a chip 305 may also include memory such as ROM, RAM, and/or flash memory. The system on a chip 305 may include voltage regulators and power management circuits. The system on a chip 305 may include a bus to connect the various components.

The computing device 300 may also include RAM 335. In some implementations, some or all of the RAM 335 is included in the system on a chip 305. The computing device 300 may also include various sensors such as an environmental sensor 340 and motion sensor 345. The environmental sensor 340 may be configured to detect humidity or air pressure or both. The motion sensor 345 may include an accelerometer, gyroscope, gravity sensor, and/or any other similar motion sensor. As with the RAM 335, the environmental sensor 340 and motion sensor 345 may also be included in the system on a chip 305.

The computing device 300 may also include a radio 350 to communicate wirelessly with other devices. For example, the radio 350 may be configured to communicate over Wi-Fi and/or Bluetooth. The computing device 300 may also include a power module 355 that is configured to regulate the power and charging functions of the device. The computing device 300 may include data storage 360 that is configured to hold the user data, application data, and any other data. The data storage 360 may be flash based. The computing device 300 may store user data in encrypted form in the data storage 360 when the computing device 300 is powered off or locked. While unlocked, the computing device 300 may store the user data in unencrypted form in the data storage 360.

Figure 4:
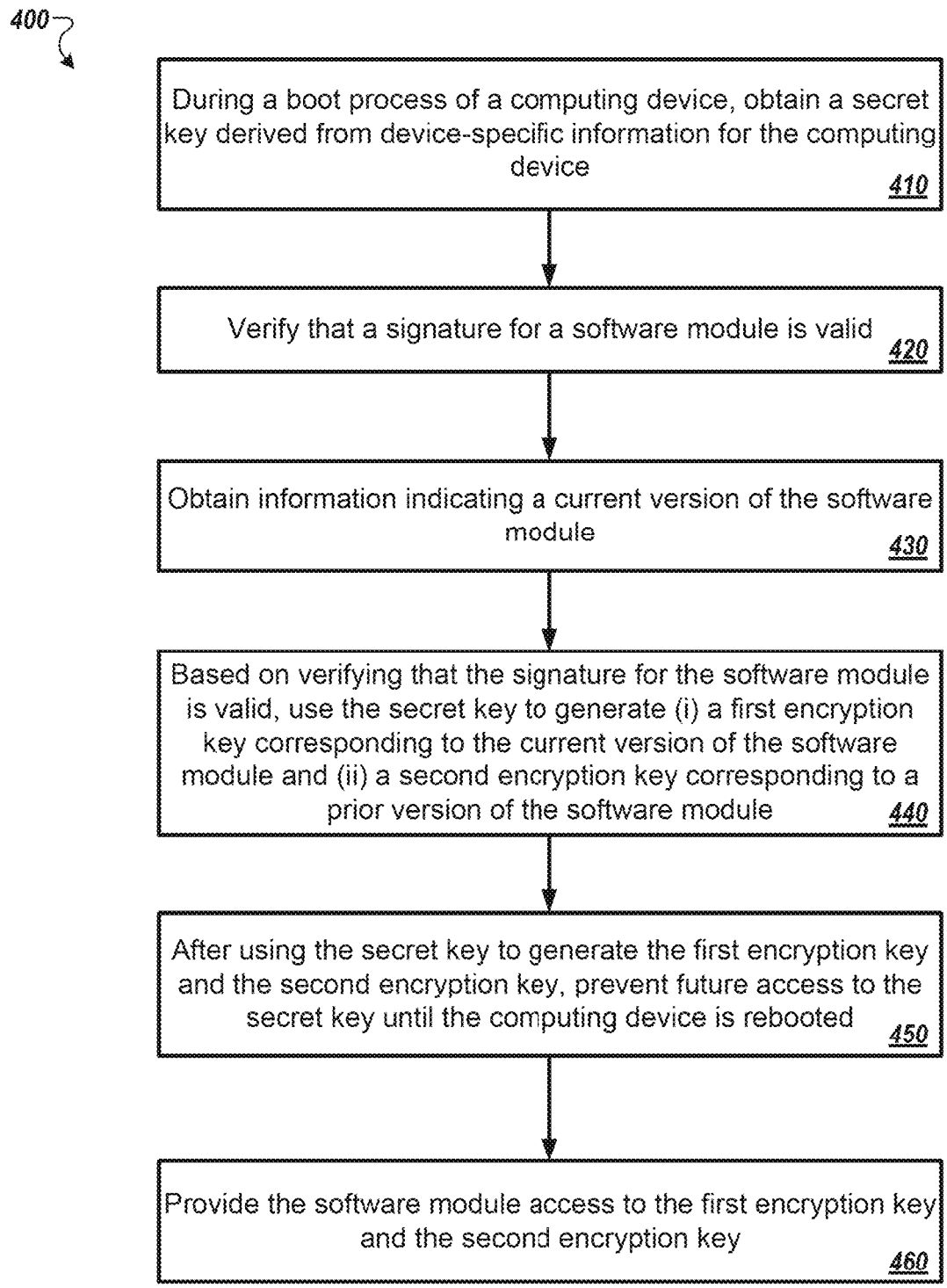
FIG. 4 illustrates an example process for rollback resistant security.

FIG. 4 illustrates an example process 400 for rollback resistant security. In general, the process 400 generated a key set that includes keys for the current version of a software application and keys for prior versions of the software application during a boot process. The process 400 will be described as being performed by a computer system comprising at one or more computers, for example, system 100 as shown in FIG. 1 or system 300 as shown in FIG. 3.

The system, during the boot process, obtains a secret key derived from device-specific information for the computing device (410). In some implementations, the device-specific information for the computing device is stored in hardware, is immutable, and is not accessible to the software module. The device-specific information may be stored in fuses and may only be accessible once per power cycle or once per boot cycle.

The system, during the boot process, verifies that a signature for a software module is valid (420). In some implementations, the system obtains the public key of the software module. The system uses the software module's public key to verify the signature of the module. In some implementations, the software module is the operating system or the kernel. In some implementations, the software module is another application running on the system such as a mail application, a photo application, a message application, or a music application.

The system, during the boot process, obtains information indicating a current version of the software module (430). In some implementations, the information indicating a current version of the software module is a version number of the software module. In some implementations, the information indicating a current version of the software module is information from which the system can determine the number of prior versions and the version number of each of the prior versions. For example, the current version may be an integer and the prior versions may also be integers with the first version being version one. If the current version is ten, then the system is able to determine the version numbers for each of the prior nine versions as they are the integers between one and nine, including one and nine. If the version number were arbitrary such as 3.14, then the system may not be able to determine the number of prior versions or the version number for each version. The system may not know if there are any versions between versions 3.0 and 3.1 or between versions two and three. The version number is not required to be strictly a number, and may include letters, text, and so on. In general, the version number is a version code from which the current version code and all prior version codes can be derived, e.g., according to a predetermined sequence or pattern. In some implementations, the current version number and prior version numbers are included in the signed data. By verifying the signature, the bootloader does not need to generate the prior version numbers from the current version number. For example, the signed data may include version numbers 3.0, 2.5, 2.3, 2.2, 2.1, 1.2, 1.1, and 1.0.

The system, during the boot process and based on verifying that the signature for the software module is valid, uses the secret key to generate (i) a first encryption key corresponding to the current version of the software module and (ii) a second encryption key corresponding to a prior version of the software module (440). In some implementations, the system generates an encryption key for each of the prior versions of the software module. For example, if the current version is version ten, then the system generates encryption keys for version ten and the prior nine versions. In some implementations, the system uses any combination of the public key of the software module, the version number of the software module, and the identifier for the software module to generate the encryption keys. For example, the system may use the public key, each version number, and the secret key to generate each encryption key. In some implementations, the system further hashes the encryption keys.

The system, during the boot process and after using the secret key to generate the first encryption key and the second encryption key, prevents future access to the secret key until the computing device is rebooted (450). In some implementations, the system overwrites the secret key. For example, the system may overwrite the secret key with all zeros. In some implementations, the system changes the permissions of the secret key to prevent access by the software module or any other software other than the bootloader. In some implementations, the system changes the permissions of the secret key to prevent access by any software including the bootloader.

The system, during the boot process, provides the software module access to the first encryption key and the second encryption key (460). In some implementations, the system, which is being controlled by the bootloader, turns over control of the system to the operating system or the kernel after providing the software module access to the encryption keys.

Figure 5:
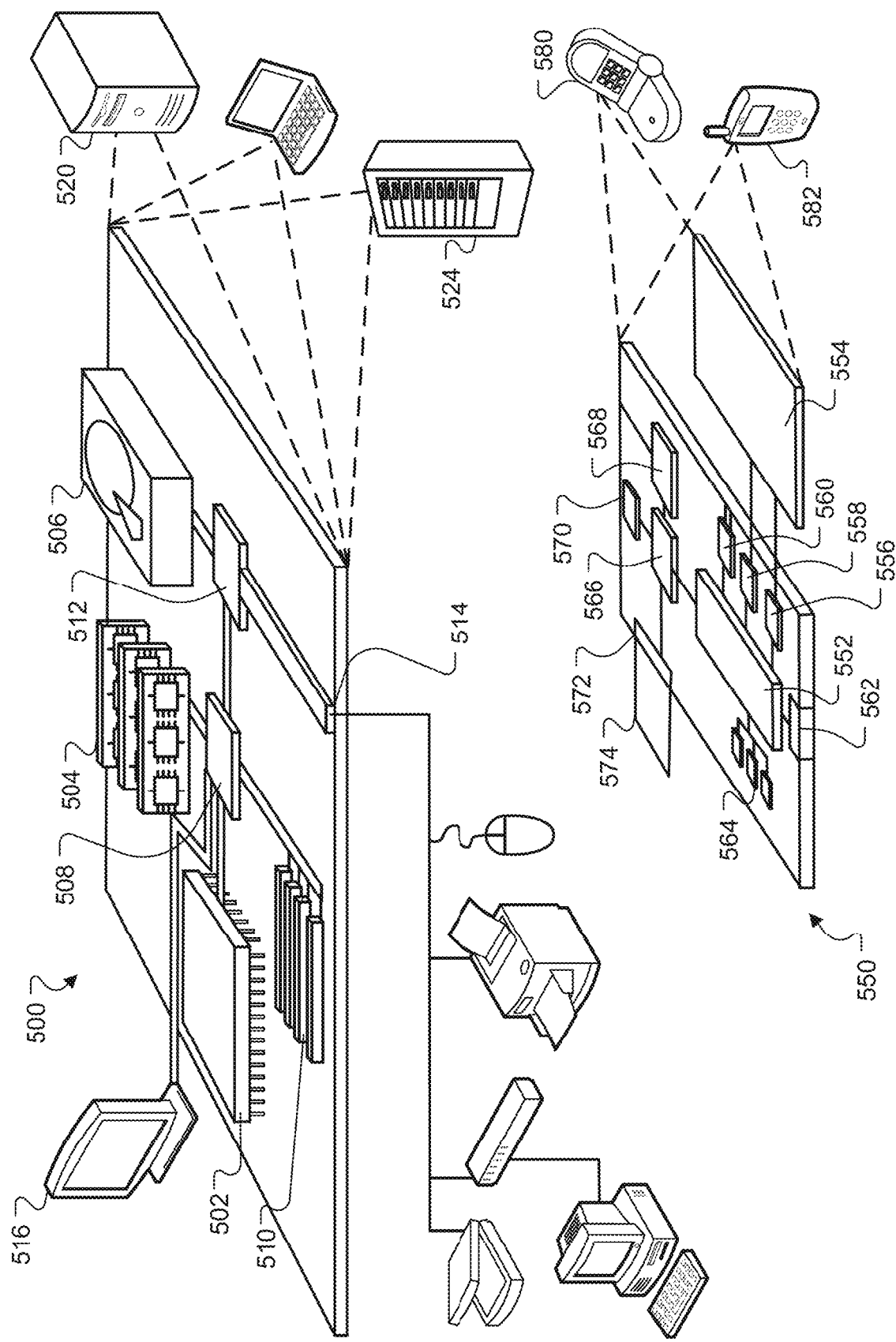
FIG. 5 illustrates an example of a computing device and a mobile computing device.

FIG. 5 shows an example of a computing device 500 and a mobile computing device 550 that can be used to implement the techniques described here. The computing device 500 is intended to represent various forms of digital computers, such as laptops, desktops, workstations, personal digital assistants, servers, blade servers, mainframes, and other appropriate computers. The mobile computing device 550 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 500 includes a processor 502, a memory 504, a storage device 506, a high-speed interface 508 connecting to the memory 504 and multiple high-speed expansion ports 510, and a low-speed interface 512 connecting to a low-speed expansion port 514 and the storage device 506. Each of the processor 502, the memory 504, the storage device 506, the high-speed interface 508, the high-speed expansion ports 510, and the low-speed interface 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as a display 516 coupled to the high-speed interface 508. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 504 stores information within the computing device 500. In some implementations, the memory 504 is a volatile memory unit or units. In some implementations, the memory 504 is a non-volatile memory unit or units. The memory 504 may also be another form of computer-readable medium, such as a magnetic or optical disk.

The storage device 506 is capable of providing mass storage for the computing device 500. In some implementations, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 502), perform one or more methods, such as those described above. The instructions can also be stored by one or more storage devices such as computer- or machine-readable mediums (for example, the memory 504, the storage device 506, or memory on the processor 502).

The high-speed interface 508 manages bandwidth-intensive operations for the computing device 500, while the low-speed interface 512 manages lower bandwidth-intensive operations. Such allocation of functions is an example only. In some implementations, the high-speed interface 508 is coupled to the memory 504, the display 516 (e.g., through a graphics processor or accelerator), and to the high-speed expansion ports 510, which may accept various expansion cards. In the implementation, the low-speed interface 512 is coupled to the storage device 506 and the low-speed expansion port 514. The low-speed expansion port 514, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. In addition, it may be implemented in a personal computer such as a laptop computer 522. It may also be implemented as part of a rack server system 524. Alternatively, components from the computing device 500 may be combined with other components in a mobile device, such as a mobile computing device 550. Each of such devices may contain one or more of the computing device 500 and the mobile computing device 550, and an entire system may be made up of multiple computing devices communicating with each other.

The mobile computing device 550 includes a processor 552, a memory 564, an input/output device such as a display 554, a communication interface 566, and a transceiver 568, among other components. The mobile computing device 550 may also be provided with a storage device, such as a micro-drive or other device, to provide additional storage. Each of the processor 552, the memory 564, the display 554, the communication interface 566, and the transceiver 568, are interconnected using various buses, and several of the components may be mounted on a common motherboard or in other manners as appropriate.

The processor 552 can execute instructions within the mobile computing device 550, including instructions stored in the memory 564. The processor 552 may be implemented as a chipset of chips that include separate and multiple analog and digital processors. The processor 552 may provide, for example, for coordination of the other components of the mobile computing device 550, such as control of user interfaces, applications run by the mobile computing device 550, and wireless communication by the mobile computing device 550.

The processor 552 may communicate with a user through a control interface 558 and a display interface 556 coupled to the display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may provide communication with the processor 552, so as to enable near area communication of the mobile computing device 550 with other devices. The external interface 562 may provide, for example, for wired communication in some implementations, or for wireless communication in other implementations, and multiple interfaces may also be used.

The memory 564 stores information within the mobile computing device 550. The memory 564 can be implemented as one or more of a computer-readable medium or media, a volatile memory unit or units, or a non-volatile memory unit or units. An expansion memory 574 may also be provided and connected to the mobile computing device 550 through an expansion interface 572, which may include, for example, a SIMM (Single In Line Memory Module) card interface. The expansion memory 574 may provide extra storage space for the mobile computing device 550, or may also store applications or other information for the mobile computing device 550. Specifically, the expansion memory 574 may include instructions to carry out or supplement the processes described above, and may include secure information also. Thus, for example, the expansion memory 574 may be provided as a security module for the mobile computing device 550, and may be programmed with instructions that permit secure use of the mobile computing device 550. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. that the instructions, when executed by one or more processing devices (for example, processor 552), perform one or more methods, such as those described above. The instructions can also be stored by one or more storage devices, such as one or more computer- or machine-readable mediums (for example, the memory 564, the expansion memory 574, or memory on the processor 552). In some implementations, the instructions can be received in a propagated signal, for example, over the transceiver 568 or the external interface 562.

The mobile computing device 550 may communicate wirelessly through the communication interface 566, which may include digital signal processing circuitry where necessary. The communication interface 566 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 568 using a radio-frequency. In addition, short-range communication may occur, such as using a Bluetooth, WiFi, or other such transceiver. In addition, a GPS (Global Positioning System) receiver module 570 may provide additional navigation- and location-related wireless data to the mobile computing device 550, which may be used as appropriate by applications running on the mobile computing device 550.

The mobile computing device 550 may also communicate audibly using an audio codec 560, which may receive spoken information from a user and convert it to usable digital information. The audio codec 560 may likewise generate audible sound for a user, such as through a speaker, e.g., in a handset of the mobile computing device 550. Such sound may include sound from voice telephone calls, may include recorded sound (e.g., voice messages, music files, etc.) and may also include sound generated by applications operating on the mobile computing device 550.

The mobile computing device 550 may be implemented in a number of different forms, as shown in the figure. For example, it may be implemented as a cellular telephone 580. It may also be implemented as part of a smart-phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computing device comprising:
a system on a chip (SoC) configured to, during a boot process of the computing device:
read a file of a software module installed on the computing device, wherein the file comprises a signature associated with an encryption key;
determine, based on a current version number of the software module, one or more updated signatures associated with one or more versions of the software module, each updated signature comprising an updated encryption key and a version number, the updated encryption key having been generated during a prior boot process and being different from the encryption key, and the one or more updated signatures being derivable from the current version number and the updated encryption key;
determine, using the file, and by comparing the signature in the file with the one or more updated signatures, that the signature for the software module is not valid; and
responsive to a determination that the signature for the software module is not valid:
discontinue the boot process and not load the software module; and
display an error on a display of the computing device.

2. The computing device of claim 1, wherein the software module is at least part of an operating system.

3. The computing device of claim 2, wherein the SoC is further configured to, during the boot process of the computing device:
obtain a public key of the operating system; and
wherein the determination that the signature for the software module is not valid comprises determining, using the file and the public key, that the signature for the operating system is not valid.

4. The computing device of claim 2, wherein the SoC is further configured to, during the boot process of the computing device:
obtain, using the file, information indicating the current version of the operating system on the computing device; and
wherein the determination that the signature for the software module is not valid comprises determining that the operating system on the computing device is an out-of-date version of the operating system.

5. The computing device of claim 4, wherein the error indicates a boot error in loading the out-of-date version of the operating system.

6. The computing device of claim 4, wherein the SoC is further configured to, during the boot process of the computing device:
responsive to a determination that the operating system on the computing device is the out-of-date version of the operating system, output an instruction for the computing device to install a valid version of the operating system or restore the computing device to factory settings.

7. The computing device of claim 4, wherein the information indicating the current version of the operating system is obtained from the signature for the operating system.

8. The computing device of claim 4, wherein the information indicating the current version of the operating system is obtained from data used to generate the signature for the operating system.

9. The computing device of claim 4, wherein the information indicating the current version of the operating system comprises an integer.

10. The computing device of claim 4, wherein the information indicating the current version of the operating system comprises a version number of the operating system.

11. The computing device of claim 1, the SoC is further configured to, during the boot process of the computing device:
obtain a secret key derived from device-specific information for the computing device; and
responsive to the determination that the signature for the software module is not valid, prevent future access to the secret key until the computing device is rebooted.

12. The computing device of claim 11, wherein the device-specific information for the computing device is stored in hardware, is immutable, and is not accessible by the software module.

13. The computing device of claim 11, wherein a prevention of future access to the secret key until the device is rebooted comprises an overwrite of the secret key with zeros.

14. The computing device of claim 11, wherein a prevention of future access to the secret key until the device is rebooted comprises an adjustment of permissions for the software module to access the secret key.

15. A computer-implemented method comprising:
during a boot process of a computing device:
reading, by the computing device, a file of a software module installed on the computing device, wherein the file comprises a signature associated with an encryption key;
determining, based on a current version number of the software module, one or more updated signatures associated with one or more versions of the software module, each updated signature comprising an updated encryption key and a version number, the updated encryption key having been generated during a prior boot process and being different from the encryption key, and the one or more updated signatures being derivable from the current version number and the updated encryption key;
determining, using the file, and by comparing the signature in the file with the one or more updated signatures, that the signature for the software module is not valid; and responsive to determining that the signature for the software module is not valid:
    discontinuing the boot process and not loading the software module; and
    displaying an error on a display of the computing device.

16. The method of claim 15, wherein the software module is at least part of an operating system.

17. The method of claim 16, the method further comprising, during the boot process of the computing device:
    obtaining, using the file, information indicating a current version of the operating system on the computing device; and
    wherein determining that the signature for the software module is not valid, determining that the operating system on the computing device is an out-of-date version of the operating system.

18. The method of claim 17, wherein the error indicates a boot error in loading the out-of-date version of the operating system.

19. The method of claim 17, the method further comprising, during the boot process of the computing device:
    responsive to determining that the operating system on the computing device is the out-of-date version of the operating system, outputting an instruction for the computing device to install a valid version of the operating system or restore the computing device to factory settings.

20. A non-transitory computer-readable medium storing software comprising instructions executable by a computing device that, upon execution, cause the computing device, during a boot process of the computing device, to:
    read a file of a software module installed on the computing device, wherein the file comprises a signature associated with an encryption key;
    determine, based on a current version number of the software module, one or more updated signatures associated with one or more versions of the software module, each updated signature comprising an updated encryption key and a version number, the updated encryption key having been generated during a prior boot process and being different from the encryption key, and the one or more updated signatures being derivable from the current version number and the updated encryption key;
    determine, using the file, and by comparing the signature in the file with the one or more updated signatures, that the signature for the software module is not valid; and
    responsive to a determination that the signature for the software module is not valid:
        discontinue the boot process and not load the software module; and
        display an error on a display of the computing device.

* * * * *